United States Patent Office 3,719,043
Patented Mar. 6, 1973

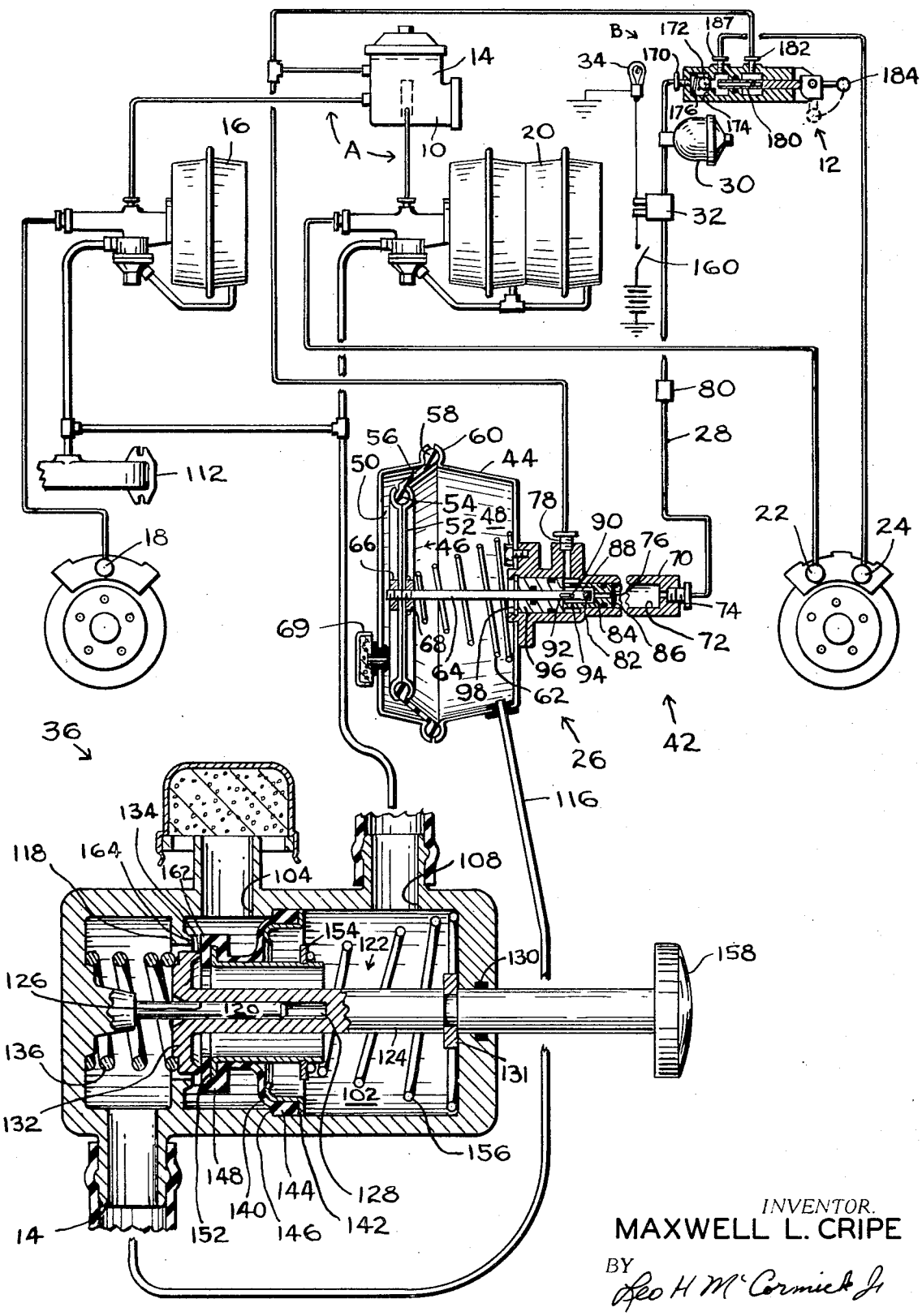

3,719,043
VACUUM POWERED SPRING BRAKE
Maxwell L. Cripe, South Bend, Ind., assignor to
The Bendix Corporation
Filed Mar. 19, 1971, Ser. No. 126,020
Int. Cl. F15b 7/00; F16d 65/24; B60t 13/00
U.S. Cl. 60—54.5 P        5 Claims

ABSTRACT OF THE DISCLOSURE

A dual power braking system having a service brake and spring brakes for emergency and parking, with the spring brake being normally rendered inoperative by a fluidic pressure force overcoming a spring to prevent rotatable frictional surfaces from contacting. To operate the spring brake, an actuator valve diverts the flow of fluid under pressure from acting on the spring which urges the frictional surfaces together to bring about braking. An indicator connector to the fluid supply conduit going to the spring brakes will indicate the pressure mode available. When the indicated pressure mode is below a predetermined value, a pump will be engaged to pressurize the operating fluid. The pump is controlled by an operator who manually regulates a value to alternately supply vacuum and atmospheric pressure to the front chamber of a pump housing. The housing is divided by a diaphragm and atmospheric pressure is freely available on the rear of the diaphragm. By alternately supplying vacuum and atmospheric pressure to the front chamber, the diaphragm and an attached piston contained in a bore will reciprocate to pressurize the fluid going to the supply conduit. The operator will be required to manually modulate the valve until the pressure mode is sufficient to hold the frictional surfaces out of contact.

BACKGROUND OF THE INVENTION

Spring brakes have been proposed as one part of the dual braking systems required by the Federal Highway's Safety Laws. Initially, the spring brake was operated by an inversion valve connected to the same source of pressurized fluid used to operate the entire braking system. If, for some reason the source of pressurized fluid was lost, the spring brakes were automatically applied, as disclosed in copending U.S. application 797,530 filed Feb. 7, 1969 now U.S. Patent No. 3,599,761, owned by the same assignee and incorporated by reference. Later, as disclosed in copending U.S. application 28,843, filed Apr. 15, 1970 now U.S. Patent No. 3,617,097, owned by the same assignee and incorporated by reference, a split full power system having an inversion valve capable of being modulated was developed to control the actuation of the spring brakes. In these split systems a pump driven by the crankshaft supplied the fluid under pressure to operate the spring brakes. Unfortunately, in modern automobiles the equipment driven by the crankshaft is ever increasing, i.e., air conditioning, power steering, fuel pump etc., with a resulting smaller crankshaft power output. In addition, the available power output has been further reduced partially by the use of unleaded gas to reduce pollution and the available engine space under the hood.

Later, in U.S. application 91,641 filed Nov. 23, 1970, owned by the common assignee of this invention and incorporated by reference, an automatic control which continually compares the force created by a pressure diffential across a diaphragm and the force required to operate the spring brake to maintain the operating fluid within a predetermined range was developed. The automatic control alternately supplies vacuum and atmospheric pressure to one side of a diaphragm with vacuum continually present on the other side to create a pressure differential across the diaphragm. This alternate creation of a pressure differential will cause the diaphragm to reciprocate and move a piston which pressurizes the fluid. As the diaphragm moves, upon reaching the extreme position of the piston stroke, a flip-flop valve alternately communicates either vacuum or atmospheric pressure to the one side. This cycling will continue until the force created by the differential pressure is equal to the force required to move the piston and pressurize the operational fluid.

SUMMARY OF THE INVENTION

It has been observed that as long as internal combustion engines are running, vacuum will be produced at the intake manifold. The intensity of the vacuum will normally be the greatest when the accelerator pedal is released, as during periods of braking and while the vehicle is stopped. This is because the intake air to the carburetor is restricted while the piston displacement is constant.

In order to conserve crankshaft power, I have devised a braking system powered by a vacuum pump for supplying high pressure fluid to operate the auxiliary spring brakes. The vacuum pumping device has a housing, the interior of which is divided by a diaphragm. A pressurizing piston is secured to a push rod which extends through and is attached to the diaphragm. The rear side of the diaphragm of the pumping device is maintained under atmospheric pressure while vacuum and atmospheric pressure are alternately communicated to the front side of the diaphragm by manual control means. Through this alternate communication a pressure differential will be created across the diaphragm which will cause the piston to move. In moving, the piston will pressurize fluid communicated by a conduit to an accumulator until the force required to move the piston is equal to the force created by the pressure differential across the diaphragm. A check valve in the conduit will prevent backflow of the fluid transmitted to the accumulator when the direction of the piston is recessed. A manually operated inversion valve has an inlet attached to the accumulator which normally permits fluid pressure to pass to the spring brakes through a control port. When an operator desires to activate the spring brakes, the inversion valve is moved to inhibit the flow of fluid from the inlet while permitting fluid flow from the control port through an outlet to a reservoir operatively connected to the inlet port of the pumping piston. In the event that a low pressure mode exists in the conduit between the check valve and the inversion valve, a signal will be transmitted to an indicator to alert the operator of this condition. Upon receiving this signal, the operator manually modulates the control means to alternately communicate vacuum and atmospheric pressure to the front of the diaphragm causing the piston to reciprocate. This manual modulation will need to continue until an operational pressure mode signal is received at the indicator device.

It is therefore an object of this invention to provide a power braking system with manual control means for operating a vacuum pump pressurizing fluid supplied to a spring brake means.

It is another object of this invention to provide an auxiliary braking system with selectively engageable operational means without utilizing the power created by the crankshaft.

It is still a further object of my invention to provide an auxiliary braking system with means to control a constant source of high pressure to operate a spring brake means.

These and other objects of my invention will become apparent from reading the specification and viewing the drawing.

BRIEF DESCRIPTION OF THE DRAWINGS

In the drawing, an enlarged sectional view of a manual control for operating a vacuum powered pump which pressurizes fluid supplied an inversion valve connected to a spring brake in the schematic dual full power braking system is shown.

DETAILED DESCRIPTION OF THE PREFERRED EMBODIMENT

In the drawing there is represented a dual full power braking system with the main system A being responsive to the split master cylinder 10 and the auxiliary system B being responsive to the inversion valve 12. Each system is operated independently of the other even though a common reservoir 14 in the master cylinder 10 is used to supply the same type of fluid to both systems.

In the main braking system A, in response to the application of a brake pedal (not shown), a piston (not shown) in the split master cylinder 10 will simultaneously transmit a pressure signal to the front lower brake servomotor 16, of a type which operates in a manner fully described in U.S. Patent 3,108,615 owned by the common assignee of the application and incorporated herein by reference, to operate the front service brakes 18 (only one of which is shown) and to the rear tandem power brake servomotor 20, which operates in the same manner as the front power brake servomotor 16, for operating the rear service brake 22 (only one of which is shown) in a manner fully described in copending U.S. application 797,530 and now U.S. Patent No. 3,599,761 incorporated herein by reference.

In the braking auxiliary system B used for emergency and parking, an inversion valve 12 of a type disclosed in copending U.S. application 28,843 and now U.S. Patent No. 3,617,097 incorporated by reference above, controls fluid pressure being upplied to a spring brake 24 operating in a manner fully described in U.S. application 797,530 and now U.S. Patent No. 3,599,761. A vacuum operated pumping device 26, responsive to manual control means 36 is operatively connected by conduit 28 to accumulator 30, for pressurizing the operational fluid received from reservoir 14. Through the accumulator 30, the fluid pressure acting on the spring brake 24 will be maintained within relatively constant range. A switch 32, of a type fully described in U.S. application 784,775, filed Dec. 18, 1968 and now U.S. Patent No. 3,593,265 owned by the same common assignee of this application and incorporated herein by reference, is located in conduit 28 adjacent the accumulator 30. Switch 32 has an internal movable shaft (not shown) which is responsive to the fluid pressure mode in the conduit 28. If a low pressure mode is present in the conduit 28, the shaft will move to close an electrical contact switch which will cause an indicator device 34, either a warning light (as shown), which continually glows or flashes or an audible signal (not shown), to be energized for alerting an operator of this low pressure condition. Upon being informed that a low pressure mode exists in the supply fluid conduit 28, the operator manually modulates the control means 36 causing piston means 40 to reciprocate and increase the pressure in the fluid conduit to a predetermined operational pressure mode.

In more particular detail the vacuum operated pumping device 26 consists of a power transmitting chamber 38 and a fluid intensifying chamber 42 connected to the spring brake means 24.

The power transmitting chamber 38 has a housing 44 with an internal cavity. A wall or diaphragm member 46 has a first bead 58 held by an annular rib 60 in the housing and a second bead 54 held to a stiff internal two-piece plate 52 which is clamped together to divide the cavity into a front chamber 48 and a rear chamber 50. A flexible portion 56 located between the first and second beads 58 and 54 will permit the wall or diaphragm member 46 to be freely moved axially within the cavity. A resilient member 62 is concentrically located on plate 52 to surround a push rod 64 attached to plate 52. A pair of nuts 66 and 68 are threaded on the push rod 64 in such a manner as to hold the two piece plate 52 together. The push rod 64 extends through the housing 44 into the intensifying chamber 42 to transmit any force created by movement of the diaphragm member 46 caused by a pressure differential between the front chamber and the rear chamber, thereinto.

The fluid intensifying chamber 42 has a cylindrical body 70 with an axially extending chamber 72 from which fluid is forced through outlet 74 by displacement piston means 40 attached to push rod 64. To replace the loss of fluid in chamber 72 upon piston means 40 moving to the right to transmit pressurized fluid to the accumulator 30, a compensating port 76 is connected to inlet port 78 in communication with reservoir 14. The change in volume of fluid in chamber 72 occurs because check valve 80 prevents the backflow of fluid as the piston means 40 returns to the left. During power activation, the compensation port 76 is closed by a poppet member 82 retained in an enlarged section 84 of the piston 86 seating on shoulder 88. The push rod 64 to which poppet member 82 is attached, projects into the enlarged section 84 and is loosely fastened to the piston 86 by cross pin 90. The cross pin 90 is fixed to the push rod 64 but moves in a slotted section 92 on the piston 86. The length of the slotted section 92 is designed to permit the poppet member 82 to be unseated when the pin engages the rear end of the slot and seated on shoulder 88 at the front end of the slot. The cross pin 92 is prevented from coming loose by a snap ring 94 positioned in a groove on the outer surface of the piston 86 overlying the ends of cross pin 138. A guide bearing 96, retained by a snap ring 98, maintains push rod 64 in alignment with the intensifying chamber 42 and prevents any fluid from entering into the front chamber 48.

The manual control means 36 consists of a housing 100, which will be adapted to be mounted on the dashboard of a vehicle (not shown), with an internal chamber 102 having an inlet port 104 connected to the atmosphere through filter 106, an outlet port 108 connected to a source of vacuum through conduit 110, such as the intake manifold 112 of an internal combustion engine and a control port 114 connected by conduit 116 to the front chamber 48 of the pumping device 26. An annular seat 118 adjacent the control port 114 concentrically surrounds an axial projection 120 on the housing 100. The first end 126 of the stem means 122 has an axial bore 128 which is mated with projection 120 and with bearing seal 130 in the housing 100 to hold shaft 124 in alignment. A disc 132 with a smaller diameter than seat 118 is fixed on the first end 126 while a first spring 136 which surrounds projection 120 acts on the disc 132 to move the stem means 122 to the right as viewed in the drawing where stop 131 abuts the housing 100. A rubber poppet 140 has one end retained in the housing 100 by a clip 142 biasing bead 144 against shoulder 146 and the other end 148 retained on metal sleeve 150 by being snap fitted around shoulder 152. A keeper 154 on the other end of the sleeve 150 holds one end of second spring 156 which urges the sleeve 150 and rubber covered shoulder against rib 134 of the disc 132. A knob 158 is placed on the second end of the stem means 122 to provide a hand hold for manually moving the stem means.

MODE OF OPERATION OF THE PREFERRED EMBODIMENT

After turning on ignition switch 160 shown in FIG. 1, if low pressure exists in the accumulator 30 and it is insufficient to release the spring brakes, a signal will be indicated through light 34. This will alert the operator not to try to attempt to move the vehicle until the fluid pressure in accumulator 30 is raised to release the spring brakes 24.

When the engine of the vehicle is started, vacuum will be created at the manifold 112. This vacuum will be transmitted through conduit 110 to inlet port 108 of manual control means 36, since the first spring 136 has a greater force than the second spring 156, the ribs 134 on disc 132 will remain seated on the face 162 of the rubber covered shoulder of the sleeve 150 to retain vacuum in chamber 102. In this position atmospheric pressure freely travels through inlet port 104 between annular seat 118 and the periphery of disc 132 out the control port 114 and into the front chamber 48 of the force transmitting chamber 38. With the rear chamber 50 being opened to the atmospheric pressure by filter 69, the resilient member 62 moves the piston 86 to the top of the intensifying stroke as shown in the drawing.

To increase the fluid pressure in the accumulator 30, the operator will press knob 158 causing stem means 122 to slide over projection 120. As stem means 122 moves to the left as view in the drawing, spring 136 will be compressed while spring 156 will at first maintain face 162 and rib 134 in a sealed position, until after the disc 132 has passed the lip 164 of annular seat 118, the face 162 will be urged against lip 164. With face 162 seated on lip 164, atmospheric pressure through inlet port 104 will terminate and the front chamber 48 be evacuated by the vacuum being communicated through conduit 116 past control port 114 between rib 134 and face 162 through sleeve 150 out port 108 and into conduit 110 connected to manifold 112. With vacuum in front chamber 48 and atmospheric pressure in rear chamber 50, a pressure differential will be created across wall diaphragm member 46. This pressure differential acting on wall or diaphragm member 46 will create a force which will move push rod 64, closing compensating port 76 and will pressurize the fluid in chamber 72 passing through outlet port 74.

Upon releasing knob 158, spring 136 acting on disc 132 will again move rib 134 into a seating seal with face 162 of the resiliently biased sleeve 150 away from lip 164. Thus, vacuum communication through control port 114 will be prevented and atmospheric pressure permitted to flow through inlet 104 and out the control port 114. With atmospheric pressure in both chambers 48 and 50, the resilient member 62 will now urge the diaphragm member 46 toward the rear chamber 50 and return the piston 86 to the up stroke position completing a single cycle. As the piston 86 is being returned, compensating port 76 is opened replacing the pressurized fluid transmitted to the accumulator 30. The above cycle is repeated by manually modulating the control means 36 until the pressure in the accumulator 30 will have reached a predetermined value sufficient to interrupt the signal transmitted by switch 32 to indicator 34. At this time, the pressure present in the system will permit the spring brakes to be released in response to the operator controlled inversion valve 12.

As shown in the drawing, inversion valve 12 is in the position with the spring brakes 24 applied. In the applied position, fluid communication from inlet port 170 connected to the accumulator 30 is inhibited by a ball valve 172 being urged against seat 174 by spring 176. Any fluid pressure acting on the spring brakes 24 can now escape through control port 178 through activation stem 180 and out the outlet port 182 to the reservoir 14.

When sufficient fluid pressure has been stored in the accumulator 30, upon moving the activation stem 180, by positioning the manual lever means 184 to the dashed location as shown in the drawing, the ball valve 172 will be unseated. With the activation stem 180 seated on ball valve 172, pressurized fluid flow will pass between the stem 180 and the seat 174 to be communicated through control port 178 to release the spring brake means 24.

In the event that a mulfunction should occur in the system with fluid being lost or unavailable at inlet port 78, the vacuum pumping device 26 would continue to operate but would not change the pressure in the accumulator 30. By designing the size of the accumulator to permit from two to five manual applications of the spring brakes 24, it is possible for the operator to move a vehicle from the roadway to a shoulder and out of the immediate line of traffic. When the fluid in the accumulator is depleted, the spring brakes will be automatically applied. This will prevent movement of the vehicle until the spring brakes are released by fluid pressure or through manual means of a type disclosed in U.S. application 38,088 filed May 18, 1970 and now U.S. Pat. No. 3,647,030 owned by the same assignee of this application and incorporated herein by reference. Thus, I have devised a braking system which will operate independently of the crankshaft power produced to effectively produce sufficient energy to maintain an emergency or parking brake system.

I claim:

1. A power braking system having a fluid operated spring brake means for use as an emergency and parking brake in response to a manually positioned control valve directing fluid under pressure supplied by a differential pressure powered manually modulated independent pumping means to control the operation of said spring brake means, said pumping means comprising:

a first housing having an internal cavity;

wall means dividing said cavity into a front chamber and a rear chamber, said rear chamber being operatively connected to the atmosphere;

a cylinder connected to said first housing having an inlet port and an outlet port, said inlet port being connected to a reservoir containing said fluid, said outlet port being connected by a conduit to said spring brake means;

check valve means located adjacent said outlet port for preventing fluid under a backflow force from the spring brake means entering said cylinder;

piston means located in said cylinder having a compensating port connected to said inlet port;

push rod means having at one end a compensating valve slidable in said piston for cooperation with said compensation port by means of a cross pin and a first slot, said cross pin also connecting said push rod means to said piston for transmitting relative motion therebetween through a second slot in the piston means, and the other end of said push rod means being connnected to said wall means, said compensating valve being connnected to said inlet port for maintaining the volume of fluid in said cylinder at a predetermined quantity;

resilient means located in said front chamber for urging said wall means toward said rear chamber to open said compensating valve and permit fluid from the inlet port to enter said cylinder;

control means having a second housing with an internal chamber with an inlet port connected to the atmosphere, an outlet port connnected to a source of vacuum and a control port connected to said front chamber;

stem means having a shaft which extends through the second housing into the internal chamber said shaft having an annular face located on an end thereof;

said shaft having an axial bore extending from the annular face inwardly, a sleeve member carried by and slidable on said stem means;

a poppet member having one end connected to the housing of the control means and the other end connected to said sleeve member;

a first spring acting on said stem means for urging said face toward said poppet member, said first spring having a resilient force sufficient to normally permit atmospheric pressure to be freely communicated past said annular face through said control port and into the front chamber of said pumping means to suspend the wall means in atmospheric pressure;

a second spring surrounding the shaft of said stem means and acting on said sleeve member to urge said poppet member toward said annular face of the stem means and an annular seat in the internal chamber of the housing;

a knob located on the end of the shaft outside said second housing; and aligning means secured to said second housing and extending into said axial bore for guiding the annular face on the stem, the poppet member, and annular seat into an assured seating position, said shaft being sequentially moved by an operator, in response to a signal indicating a pressure mode insufficient to operate the spring brake means, said operator upon initially pushing said knob to compress said second spring and permit said annular face to be moved away from the poppet member while said first spring urges said poppet toward said annular seat on the second housing to thereby terminate the supply of atmospheric pressure going to the control port and allow vacuum to be communicated to the front chamber of the pumping means, said vacuum communication creating a pressure differential across the wall means which will move the piston means into the bore and thereby pressurize the fluid admitted through said inlet port by forcing said fluid through said outlet port into the supply conduit for operating the spring brake means, said knob upon later being released being guided by said aligning means to allow said second spring to seat said annular face on said poppet member and thereby terminate said vacuum and allow the atmospheric pressure to be communicated to said front chamber where said resilient means will move said wall means rearwardly to bring the piston means out of said bore into a position to begin another pressurizing cycle.

2. The power braking system, as recited in claim 1 including: means responsive to the fluid pressure being supplied to said spring brake means for transmitting a signal to an indicator device to inform the operator of the intensity of the pressure mode existing in the supply conduit.

3. The power braking system, as recited in claim 1 further including: means connected to the supply conduit downstream from the flow control means for storing a supply of fluid under pressure sufficient to permit a series of spring brake releases without the continued aid of said pumping means.

4. The power braking system, as recited in claim 3 further including: actuating means having an inlet connected to said means for storing a supply of fluid under pressure, an outlet port connected to said reservoir and a control port connected to said spring brake means, said actuating means having a first operational mode where the flow of fluid under pressure available at said inlet port is communicated through said control port to said spring brake means to prevent the frictional engagement of members contatined therein and a second operational mode where the flow of fluid through said inlet port is inhibited and the fluid under pressure acting on said frictional member escapes from the control port through the outlet port and into the reservoir to allow resilient means within said spring brake means to urge said frictional members into contacting engagement.

5. The power braking system, as recited in claim 4 wherein said indicator device continues to receive said signal indicating the pressure mode until the operator has modulated said control means to cause the piston means to reciprocate sufficiently to raise the fluid pressure in the storage means to a predetermined value.

References Cited
UNITED STATES PATENTS

| | | | |
|---|---|---|---|
| 3,114,580 | 12/1963 | McDuff | 303—9 |
| 3,162,018 | 12/1964 | Daley | 60—54.6 P |
| 3,452,646 | 7/1969 | Abbott et al. | 137—627.5 |
| 3,528,707 | 9/1970 | Casey | 188—170 |
| 3,599,761 | 8/1971 | Schultz | 188—170 |
| 3,113,806 | 12/1963 | Cripe | 60—54.6 P |
| 3,095,067 | 6/1963 | Murty et al. | 188—170 |
| 3,497,265 | 2/1970 | Vandermark | 303—9 |
| 3,222,999 | 12/1965 | Hager | 137—627.5 |
| 2,880,854 | 4/1959 | Williams et al. | 137—627.5 |
| 3,195,417 | 7/1965 | Hager et al. | 137—627.5 |

MARTIN P. SCHWADRON, Primary Examiner

A. M. ZUPCIC, Assistant Examiner

U.S. Cl. X.R.

188—170; 303—9; 137—627.5